United States Patent [19]

Godbole

[11] Patent Number: 5,065,427
[45] Date of Patent: Nov. 12, 1991

[54] FAX/DATA CALL RECEIVING SYSTEM AND METHOD

[75] Inventor: Vishwas R. Godbole, 18754 Cabernet Dr., Saratoga, Calif. 95070

[73] Assignee: Vishwas Godbole, Saratoga, Calif.

[21] Appl. No.: 429,801

[22] Filed: Oct. 31, 1989

[51] Int. Cl.$^5$ ............................................ H04M 11/00
[52] U.S. Cl. ...................................... 379/100; 358/400
[58] Field of Search ................... 379/100, 67; 358/400, 358/439, 434

[56] References Cited

U.S. PATENT DOCUMENTS

| | | | |
|---|---|---|---|
| 4,238,775 | 12/1980 | Vandling | 358/439 |
| 4,759,053 | 7/1988 | Satomi et al. | 379/100 |
| 4,850,008 | 7/1989 | Berg et al. | 379/100 |
| 4,856,049 | 8/1989 | Streck | 379/67 |
| 4,905,273 | 2/1990 | Gordon et al. | 379/100 |
| 4,918,722 | 4/1990 | Duehren et al. | 379/100 |

FOREIGN PATENT DOCUMENTS 2212363 7/1989 United Kingdom ............... 379/100

Primary Examiner—James L. Dwyer
Assistant Examiner—Ahmad F. Matar
Attorney, Agent, or Firm—Flehr, Hohbach, Test, Albritton & Herbert

[57] ABSTRACT

System and method for receiving facsimile calls and data modem calls with a single telephone line. An incoming call is monitored for a first period of time following receipt of the call to identify the call as either a facsimile call or a data modem call, and a handshaking procedure is initiated if the call is identified. In the event that the call is not identified, a data modem handshaking procedure is initiated, and if that procedure is not successful, the call is assumed to be a facsimile transmission, and a facsimile handshaking procedure is initiated. When the type of call has been identified, appropriate FAX or data communications software is automatically selected for processing the particular type of call.

14 Claims, 4 Drawing Sheets

FAX/DATA CALL RECEIVING SYSTEM AND METHOD

This invention pertains generally to facsimile and data communications systems and, more particularly, to a system and method for identifying and routing facsimile and data calls received on a single telephone line.

In recent years, there has been increasing use of data modems and facsimile machines, and it is expected that the use of facsimile modems will also increase rapidly. Most facsimile modems are designed for use with personal computers such as the IBM PC or the Apple Macintosh, and they can be in the form of cards or boards which are mounted within the computer or external units which are connected to the computer through a communications port.

Most data modems and facsimile modems are currently constructed as separate units which require separate telephone lines and separate card slots or ports in the computer. Some FAX cards are available, however, with an optional data modem which can be added to the cards, and this permits a single telephone line to be shared between the facsimile and data modem functions. However, the data modem operates independently of the FAX modem, and the system must be set up in advance for the type of call to be received. Since it is generally not known in advance whether the next call will be a facsimile call or a data modem call, there is a good chance that the system will be configured for the wrong type of call when a call is received, in which case the call will be missed.

It is in general an object of the invention to provide a new and improved system and method for receiving facsimile calls and data modem calls with a single telephone line.

Another object of the invention is to provide a system and method of the above character in which facsimile calls and data modem calls are automatically identified and routed upon receipt.

Another object of the invention is to provide a system and method of the above character in which FAX or data communications software is automatically selected for processing an incoming call.

These and other objects are achieved in accordance with the invention by monitoring an incoming call for a first period of time following receipt of the call to identify the call as either a facsimile call or a data modem call initiating a handshaking procedure corresponding to the type of call if either a facsimile call or a data call is identified during the first period of time, initiating a data modem handshaking procedure for a second period of time in the event that the call is not identified as either a facsimile call or a data call during the first period of time, and thereafter initiating a facsimile call handshaking procedure in the event that the data modem handshaking procedure is not successful. When the type of call has been identified, appropriate FAX or data communications software is automatically selected for processing the particular type of call.

Figure 1:
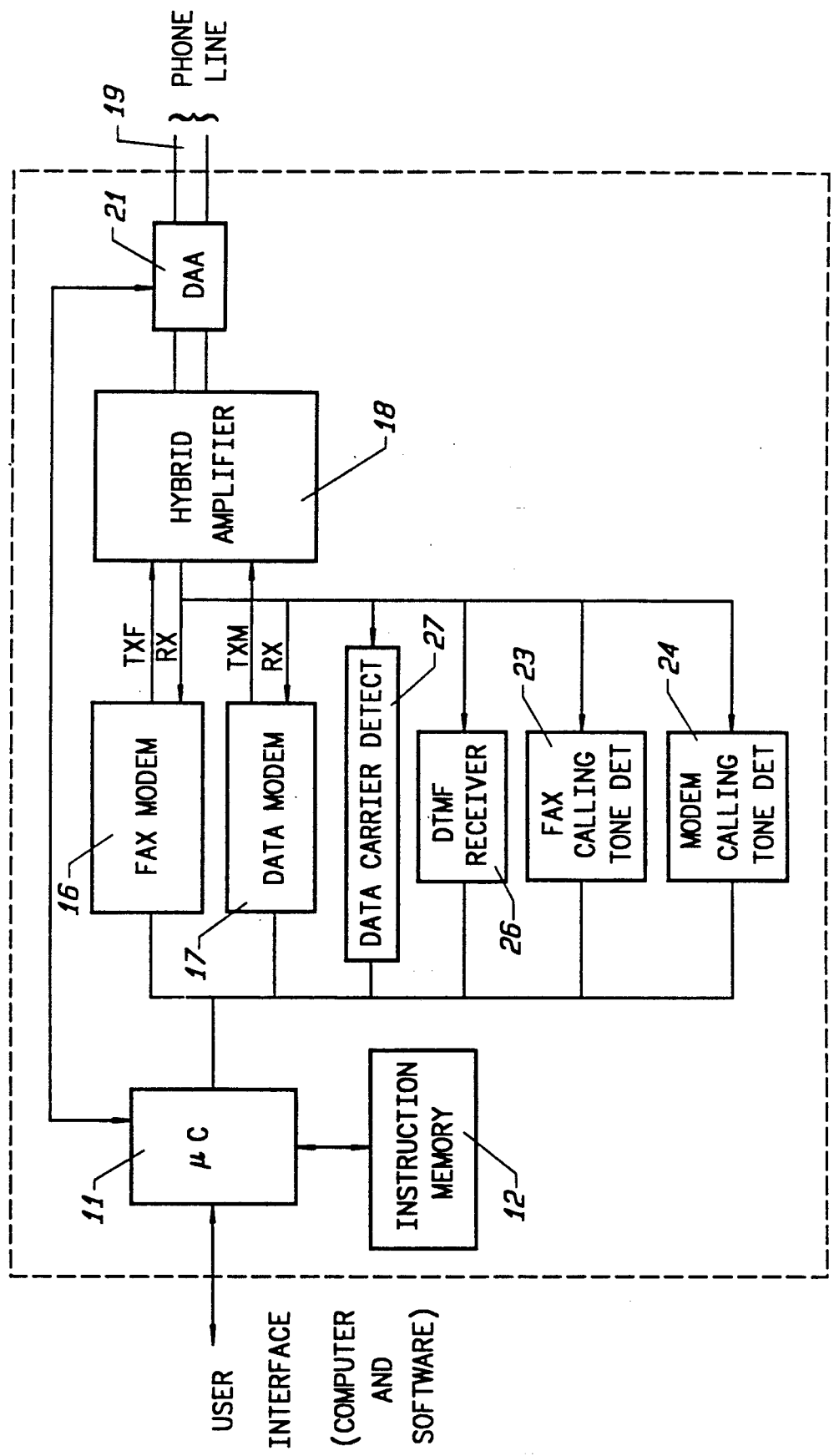
FIG. 1 is a block diagram of one embodiment of a system or identifying and routing facsimile and data modem calls in accordance with the invention.

As illustrated in FIG. 1, the system includes a microprocessor or controller 11 which interfaces with a personal computer or another computer of suitable design. The computer might, for example, be an IBM PC, a PC compatible or an Apple Macintosh computer. The controller has an instruction memory 12, and it interfaces with the computer through either a serial interface or a parallel bus interface. The user interface includes one or more application programs which handle FAX and data communications.

A FAX modem 16 and a data modem 17 are connected to the controller. In the preferred embodiment, the FAX modem and the data modem are combined on a single card which is installed in a slot on the motherboard of the computer or in a single external unit which is connected to a serial communications port of the computer.

The transmitter outputs of the FAX modem and the data modem are connected to the transmitter inputs of a hybrid amplifier 18, and the receiver output of the hybrid amplifier is connected to receiver inputs of the modems. The hybrid amplifier is connected to a phone line 19 by a DAA circuit 21 which is equivalent to the old AT&T data access arrangement with a coupling transformer, a ringing detector, and a hook switch. The DAA circuit operates under the control of the controller 11.

A FAX calling tone detector 23 and a modem calling tone detector 24 are connected to the outputs of the hybrid amplifier, and the outputs of these detectors are monitored by the controller. These detectors respond to identifying tones which are transmitted by FAX machines and data modems, and they are designed in accordance with the types of tones employed in the respective transmitting devices. For example, under the CCITT specifications, an auto dialing FAX machine is required to transmit a calling tone having a frequency of 1100 Hz, a duration of 0.5 second, and a repetition rate of 3 seconds, and the FAX calling tone detector in one presently preferred embodiment is designed to respond to this signal. A number of data modems currently in use transmit a calling tone having a frequency of 1300 Hz, a duration of 0.5 second, and a repetition rate of 1.5 seconds, and the modem calling tone detector in the preferred embodiment is designed to respond to this tone. It will be understood, however, that any desired tones can be employed and that the tone detectors will be designed accordingly. It will also be understood that a detector can be designed to respond to more than one tone and that a plurality of detectors can be employed to identify tones from different types of FAX machines or modems.

A dual tone multi-frequency (DTMF) receiver 26 is also connected to the receiving output of the hybrid amplifier to detect calls from data modems which do not transmit a calling tone. Such modems include Hayes modems and Hayes compatible modems which can be programmed by the user to dial a remote modem, wait for a quiet answer of predetermined duration, then transmit a predetermined digit (0-9) using DTMF signalling. This tone is recognized by the DTMF receiver, and the output this receiver is monitored by the controller.

A data carrier detector 27 is also connected to the receiving output of the hybrid amplifier. This detector is designed to respond to a carrier signal for data from a data modem.

Figure 2A:
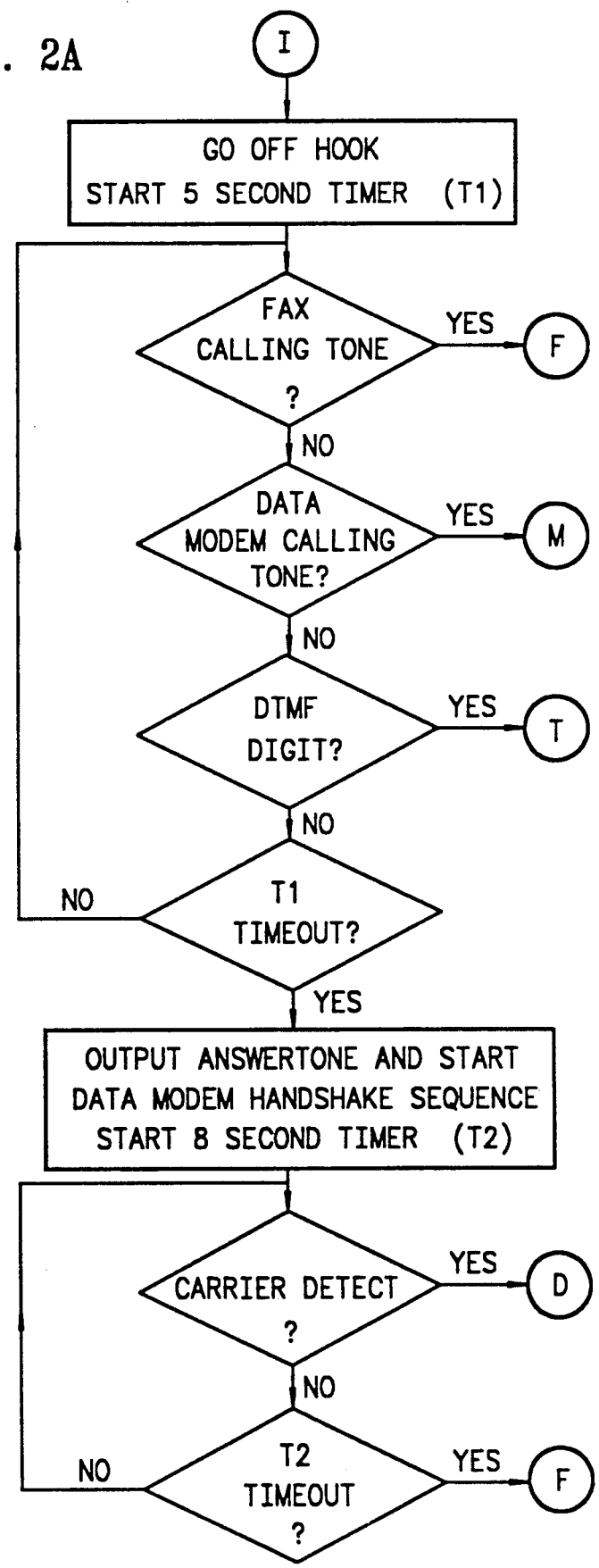
FIGS. 2A and 2B are a flow chart illustrating the operation of the system of FIG. 1.
Figure 2B:
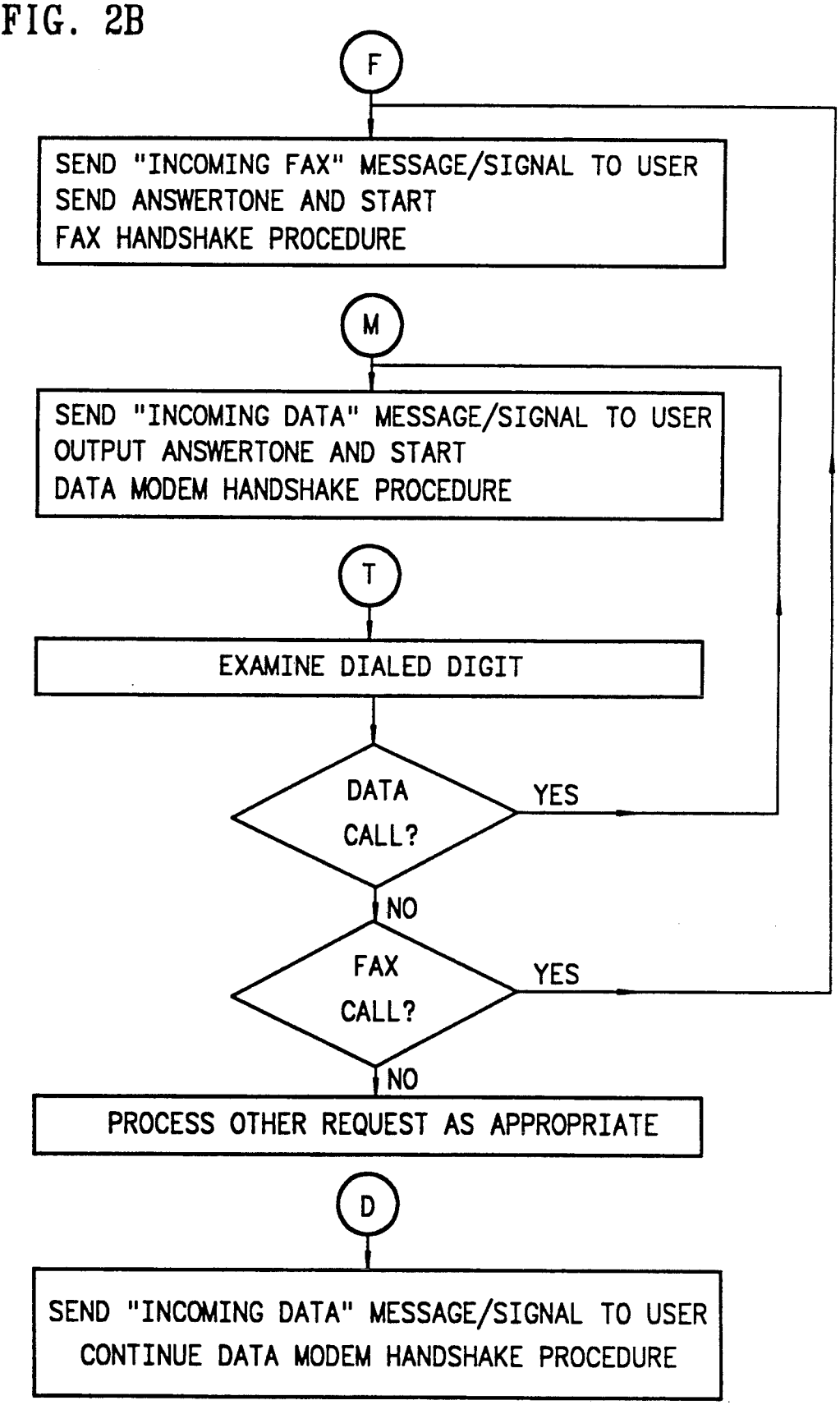

Operation and use of the system of FIG. 1, and therein the method of the invention, can be described with reference to the flow charts of FIGS. 2A, 2B and 3. In this example, it is assumed that the calling tone detectors are designed to detect calling tones having repetition rates of 3 seconds and 1.5 seconds, respectively, and that the Hayes modems and Hayes compatible modems are programmed for a quiet answer period of slightly more than 4 seconds.

Upon receipt of an incoming call, the outputs of the calling tone detectors and the DTMF receiver are monitored for a predetermined period of time in an effort to identify the type of call which has been received. With calling tones having repetition rates of 1.5 and 3 seconds and Hayes modems having a quiet period of just over 4 seconds, a time period of 5-6 seconds is sufficient for a calling tone or a DTMF identifying signal to occur. In the present example, a period of 5 seconds is employed, and this period is defined by a software timer which starts when the incoming call is answered. If either a FAX calling tone, a data modem calling tone or a DTMF digit is identified within the 5 second period, the system switches to the appropriate processing mode for the call, and a handshaking sequence begins.

Thus, if a FAX calling tone is detected, a message or signal is sent to the host computer to indicate that a facsimile transmission is being received, an answering tone is sent to the calling machine, the system switches to FAX communications software, and the FAX handshaking procedure is initiated. If a data modem calling tone is detected, a message or signal is sent to the host computer to indicate that a data transmission is being received, an answering tone is output, the system switches to data communications software, and the data modem handshaking procedure is begun. If a DTMF digit is detected, the digit is examined, and either a FAX handshaking procedure, a data modem handshaking procedure, or another procedure is initiated as dictated by the digit which is detected. A message or signal is sent to the host computer to indicate the type of call which is being received, and the system switches to the appropriate application software.

In the event that the type of call is not identified within the initial 5 second period, the system switches to the data modem mode, outputting an answering tone and initiating the data modem handshaking sequence. At the same time, a second timer (e.g. 8 seconds) is started, and the output of the data carrier detector is monitored. If a carrier from the remote device is detected, the device is assumed to be a data modem, the system swithes to data communications software, and the handshaking sequence is allowed to proceed as a normal data modem call.

If no data carrier is detected within the 8 second period, the call is assumed to be a facsimile transmission, and the system switches to the FAX receiving mode, outputting an answering tone, switching to FAX communications software, and initiating the facsimile handshaking sequence.

The invention is able to distinguish between facsimile transmission and data modem transmissions by this procedure because a calling FAX machine waits to receive a framing signal with a certain modulation scheme and remains silent if the initial framing signal is not properly received. A data modem, on the other hand, responds to a handshake sequence by outputting a sequence of modulated carrier signal. Thus, a data modem can be identified by detecting its carrier signal, and a FAX machine can be identified by its silence during the handshake sequence for a data modem.

Figure 3:
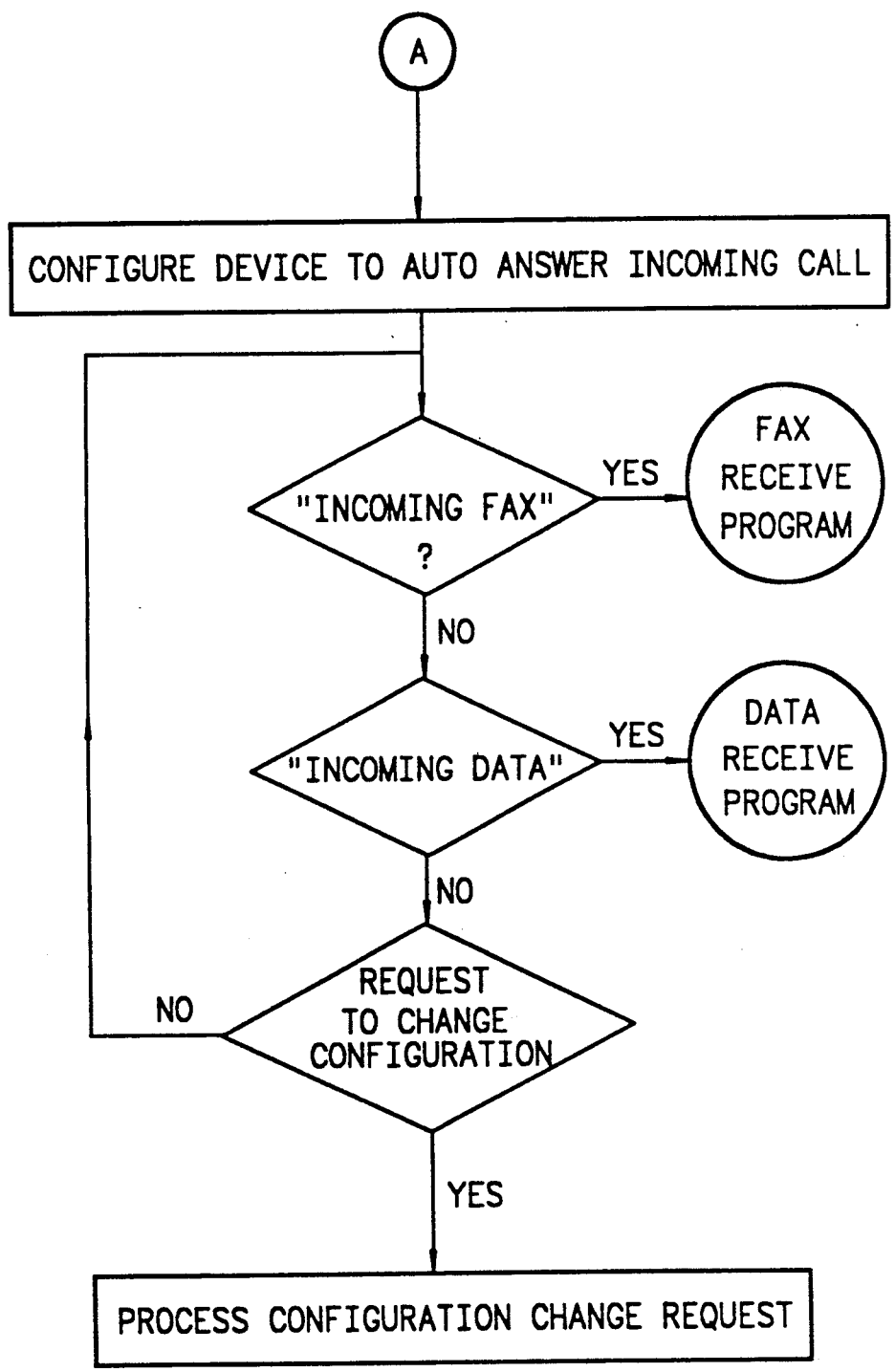
FIG. 3 is a flow chart of a supervisory application program for selecting either FAX or data communications software in accordance with the nature of an incoming call.

As illustrated in FIG. 3, the supervisory program configures the system to automatically answer an incoming call. Upon receipt of a message or signal indicating that either a FAX call or a data call is being received, the supervisory system switches the system to the appropriate FAX or data communications software. If a request to change the configuration of the system is received, this request is processed. Otherwise, the supervisory program continues to look for a message or signal which indicates the type of call received.

In the event that neither a FAX call nor a data call is established, the controller will disconnect the system from the phone line and terminate the processing sequence for the call.

The making of a FAX call or a data call from the system is straightforward because the user knows which type of call he is making and can instruct the computer accordingly.

The invention has a number of important features and advantages. It permits the design of a combination FAX/data modem device that can operate with a single telephone line for making or receiving either FAX or data calls. Incoming calls are automatically identified and routed accordingly, and appropriate application software is selected for processing the incoming call.

It is apparent from the foregoing that a new and improved system and method have been provided for receiving facsimile calls and data modem calls with a single telephone line. While only certain presently preferred embodiments have been described in detail, as will be apparent to those familiar with the art, certain changes and modifications can be made without departing from the scope of the invention as defined by the following claims.

I claim:

1. In a system for receiving calls from a facsimile machine and from a data modem:
    a facsimile call detector,
    a data call detector,
    means active upon receipt of a call for monitoring the outputs of the facsimile call detector and the data call detector for a first period of time to identify the type of call received,
    means for initiating a handshaking procedure corresponding to the type of call received if either a facsimile call or a data call is identified during the first period of time,
    means for initiating a data modem handshaking procedure for a second period of time in the event that the call is not identified as either a facsimile call or a data call during the first period of time, and
    means active after the second period of time for initiating a facsimile call handshaking procedure in the event that the data modem handshaking procedure is not successful.

2. The system of claim 1 include means for providing a signal which indicates the type of call received, and means responsive to the message/signal for implementing communications software for the type of call received.

3. The system of claim 1 Wherein the first time period has a duration on the order of 5-6 seconds.

4. The system of claim 1 wherein the second time period has a duration on the order of 8 seconds.

5. The system of claim 1 including a tone receiver, and means responsive to the tone receiver during the first time period for initiating the data modem handshaking procedure in response to a tone of predetermined frequency.

6. The system of claim 1 including a tone receiver, and means responsive to the tone receiver during the first time period for initiating the facsimile call handshaking procedure in response to a tone of predetermined frequency.

7. The system of claim 1 including a DTMF tone receiver, and means responsive to the tone receiver for initiating a facsimile handshaking procedure upon receipt of a tone corresponding to a first predetermined digit, initiating a data modem handshaking procedure upon receipt of a tone corresponding to a second predetermined digit, and initiating another procedure upon receipt of tone corresponding to another digit.

8. In a method of receiving calls from a facsimile machine and from a data modem, the steps of:
monitoring a call for a first period of time following receipt of the call to identify the type of call,
initiating a handshaking procedure corresponding to the type of call received if either a facsimile call or a data call is identified during the first period of time,
initiating a data modem handshaking procedure for a second period of time in the event that the call is not identified as either a facsimile call or a data call during the first period of time, and
thereafter initiating a facsimile call handshaking procedure in the event that the data modem handshaking procedure is not successful.

9. The method of claim 8 including the steps of providing a signal which indicates the type of call received, and implementing communications software for the type of call received in accordance with the message/signal.

10. The method of claim 8 wherein the first time period has a duration on the order of 5-6 seconds.

11. The method of claim 8 wherein the second time period has a duration on the order of 8 seconds.

12. The method of claim 8 including the steps of monitoring the call for a tone signal during the first period of time, and initiating the data modem handshaking procedure in the event that a tone of predetermined frequency is detected.

13. The method of claim 8 including the steps of monitoring the call for a tone signal during the first period of time, and initiating the facsimile call handshaking procedure in the event that tone of predetermined frequency is detected.

14. The method of claim 8 including the steps of monitoring the call for a DTMF tone signal during the first period of time, and initiating either the facsimile handshaking procedure or the data modem handshaking procedure in the event that a DTMF digit of predetermined value is detected, or initiating another procedure in the event that a DTMF digit of another value is detected.

* * * * *